Jan. 31, 1933.          H. G. ELLIS                1,895,921
        APPARATUS FOR ROLLING AND PRESSING RUBBER SHOES
                Filed April 7, 1931         7 Sheets-Sheet 2
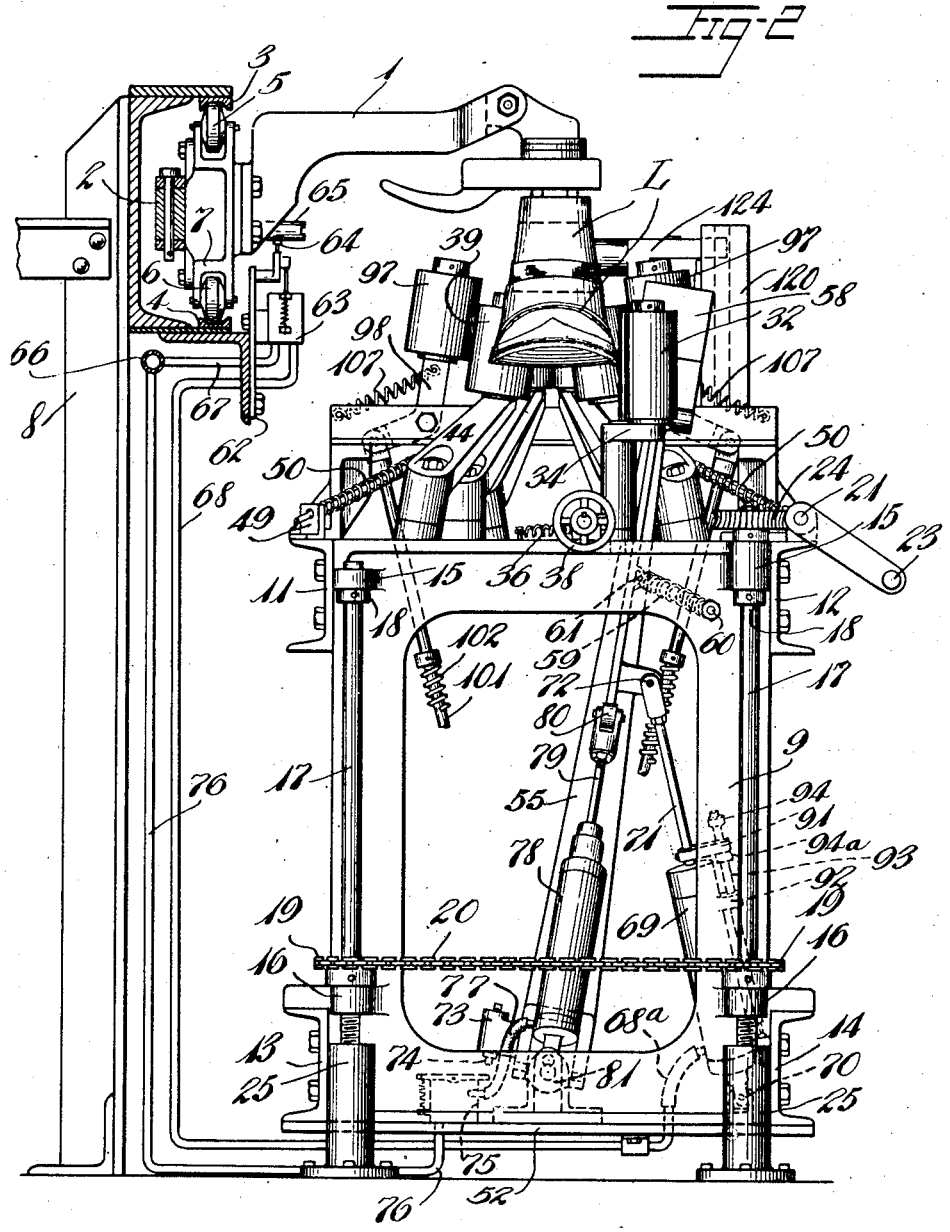

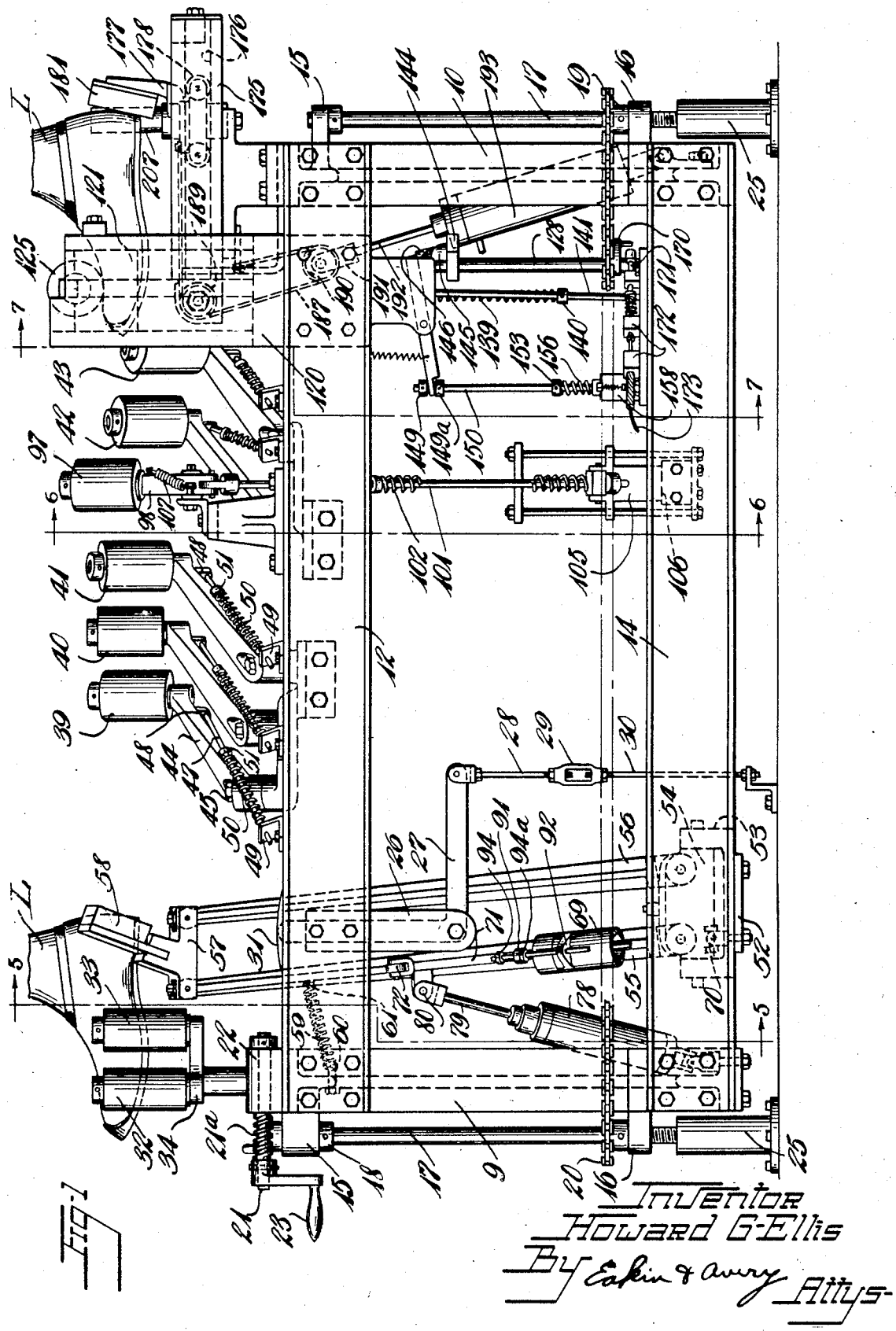

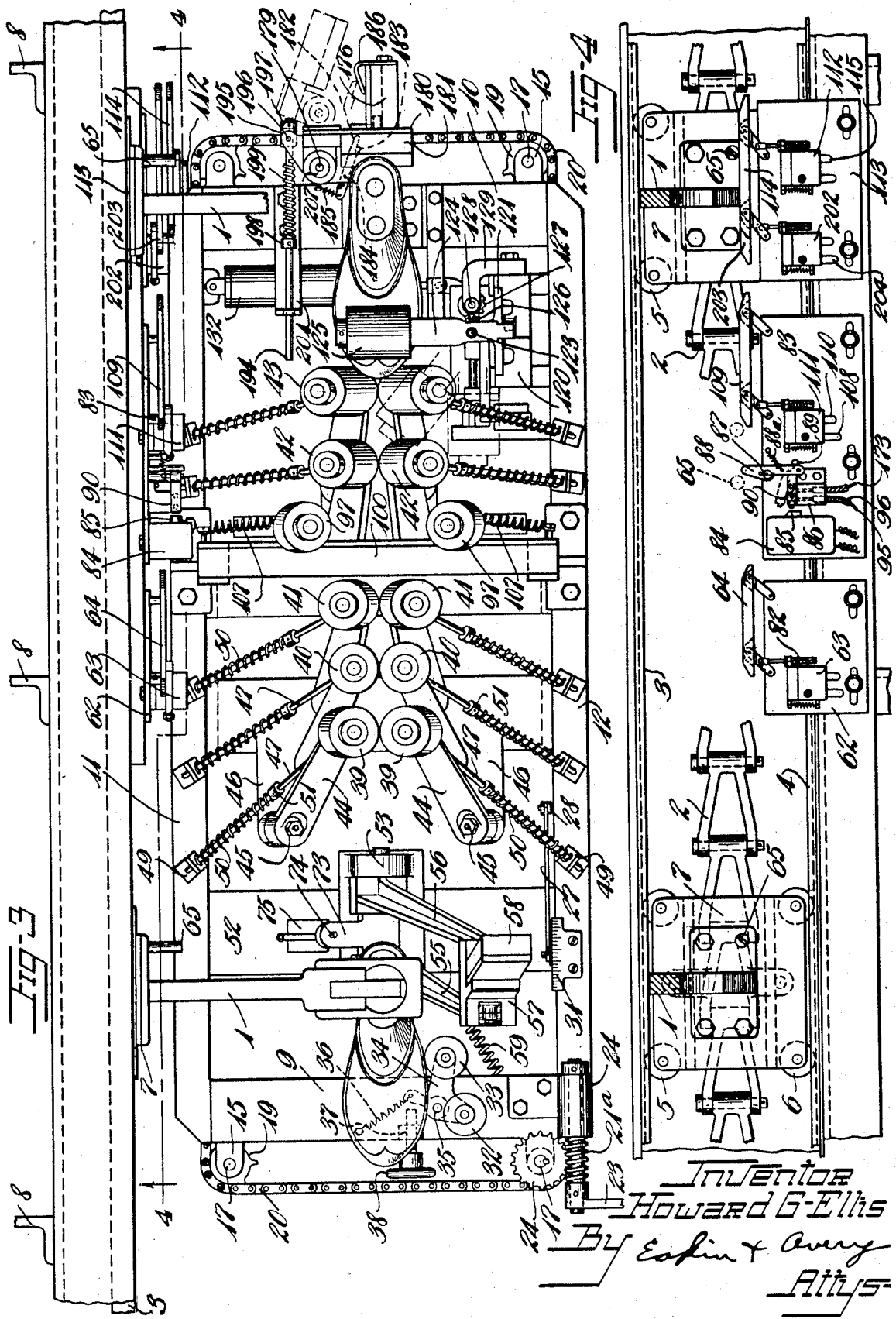

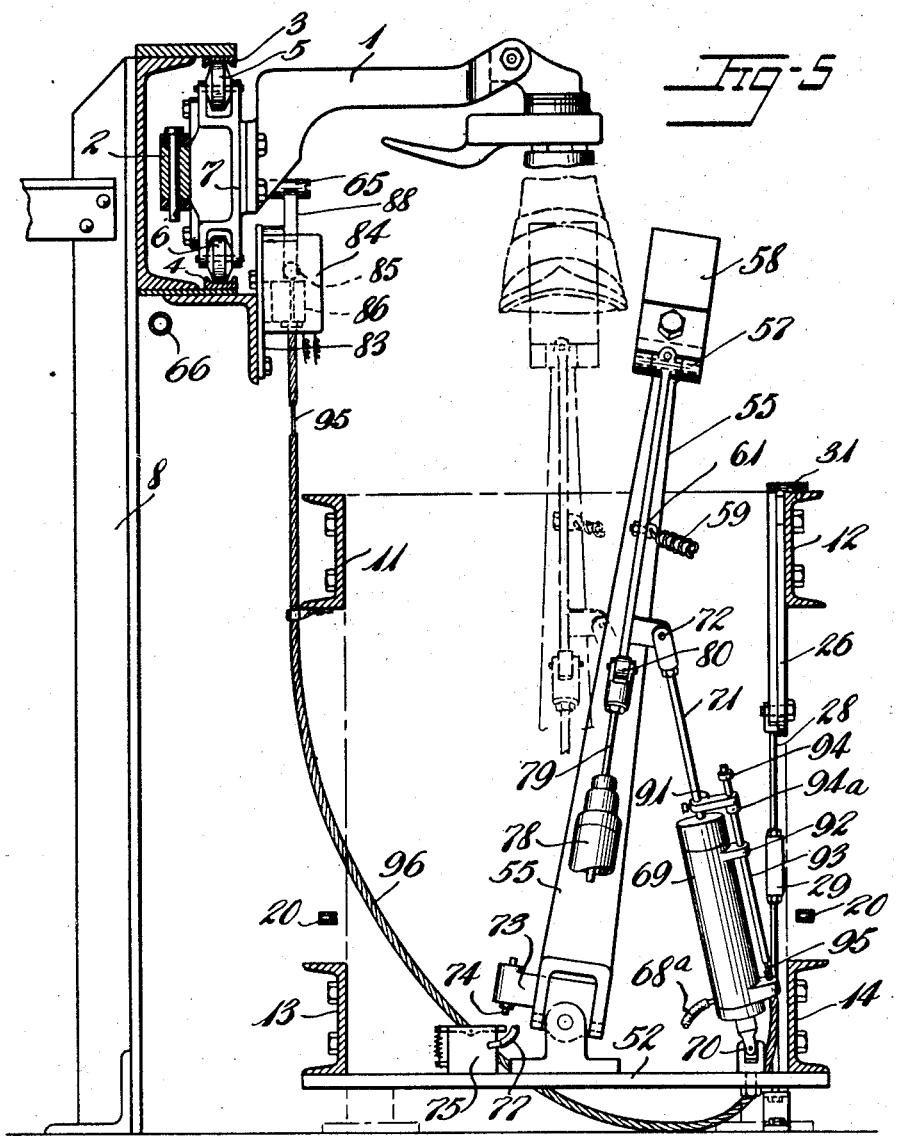

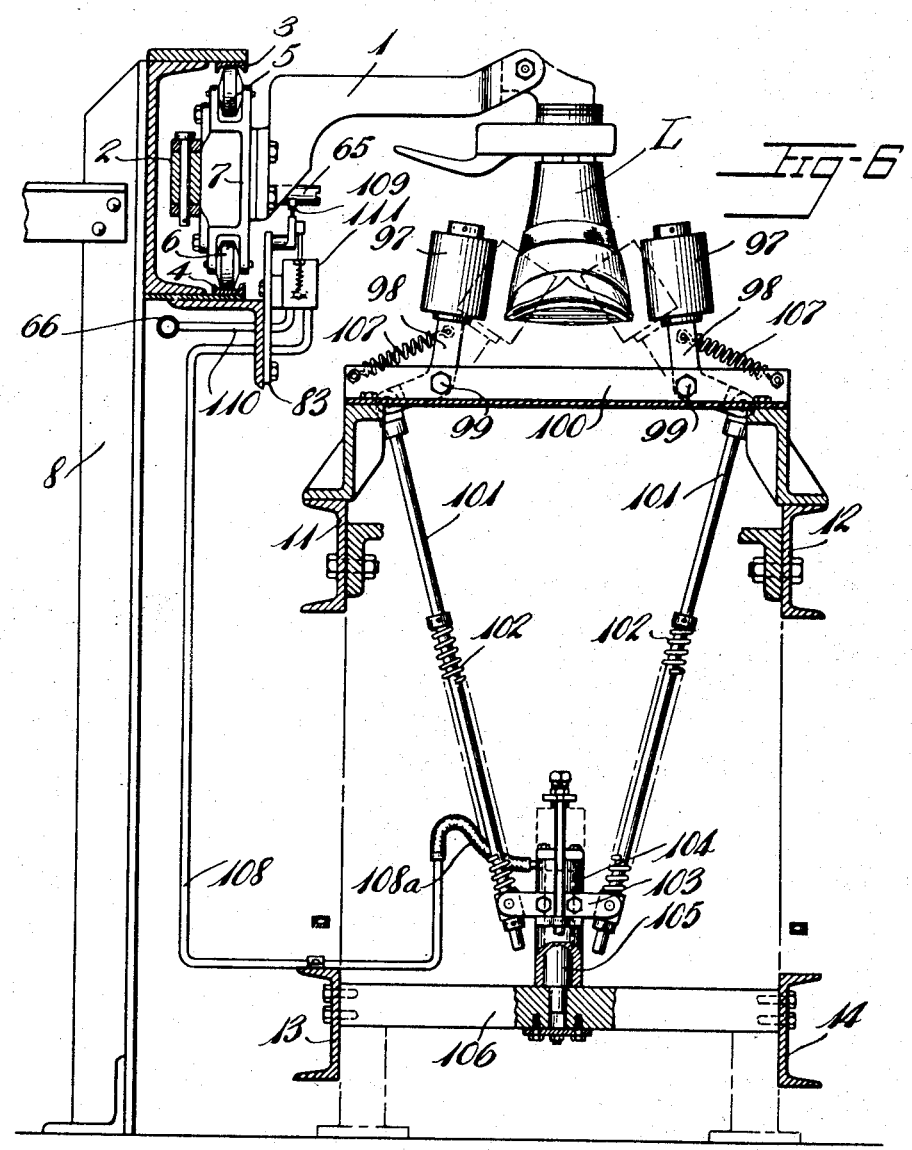

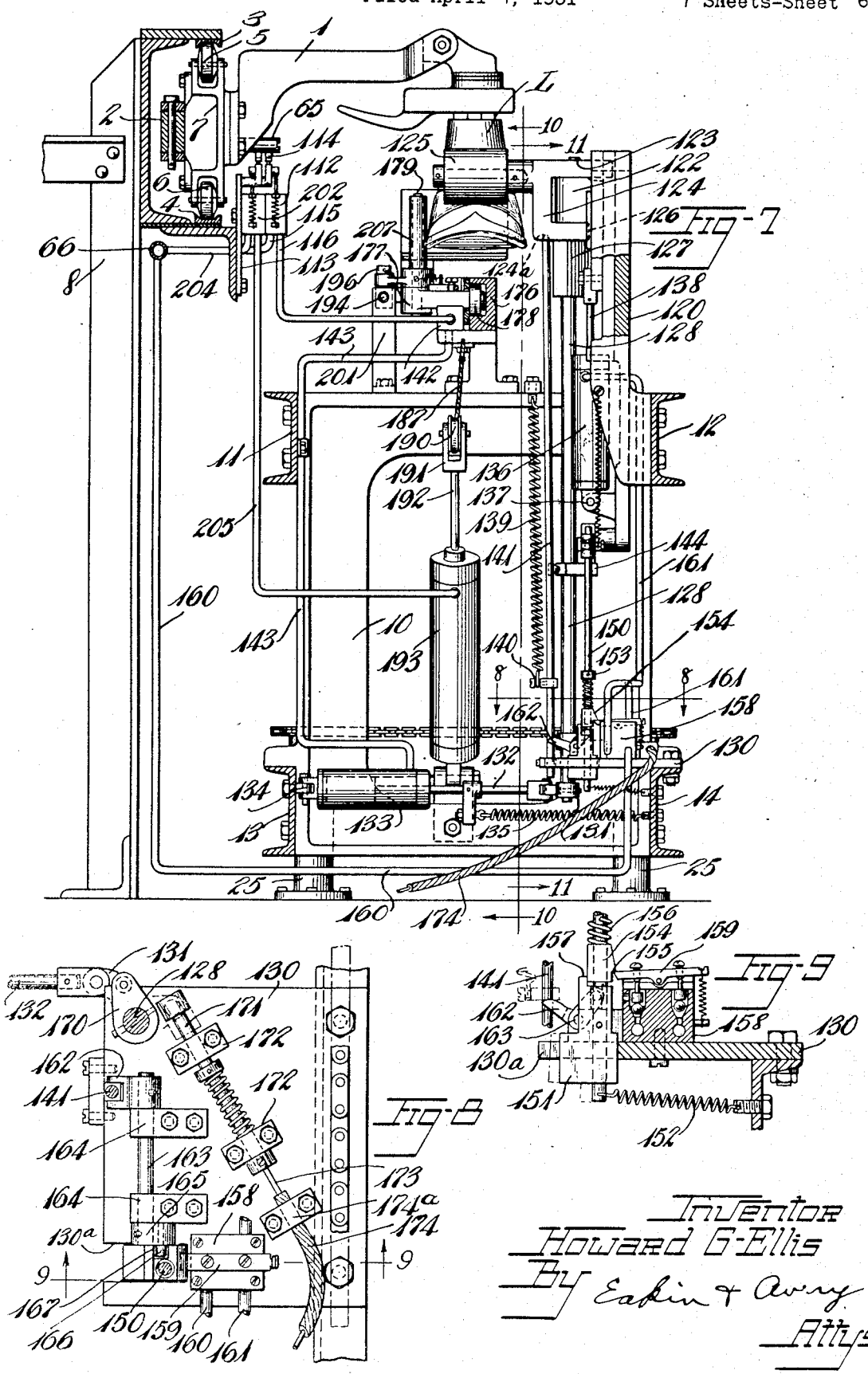

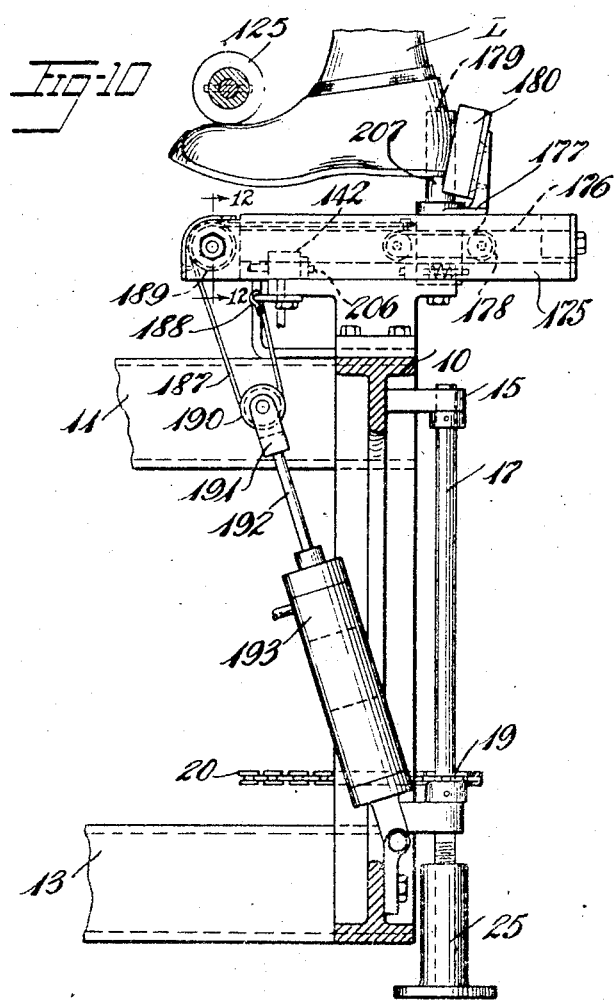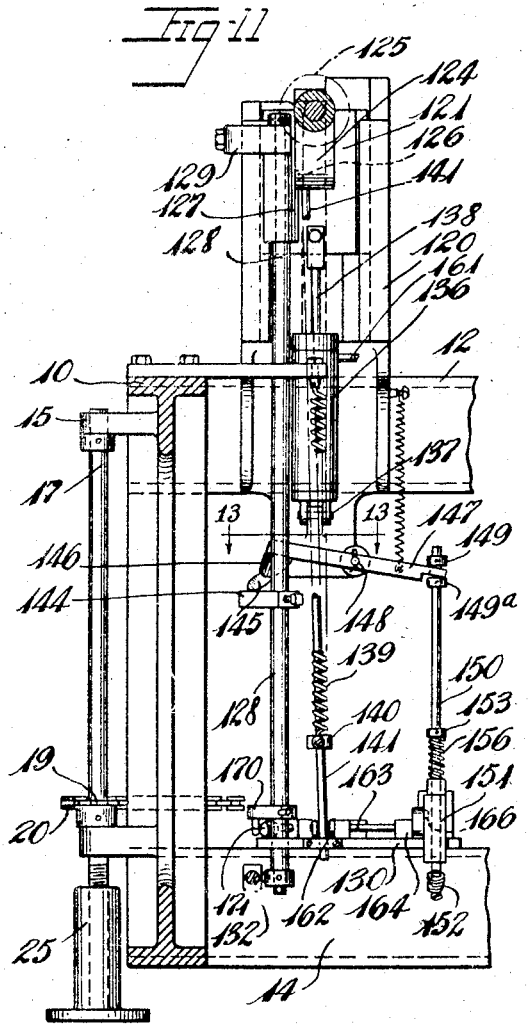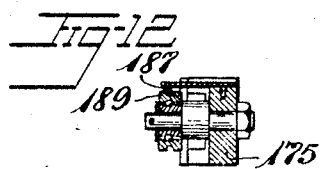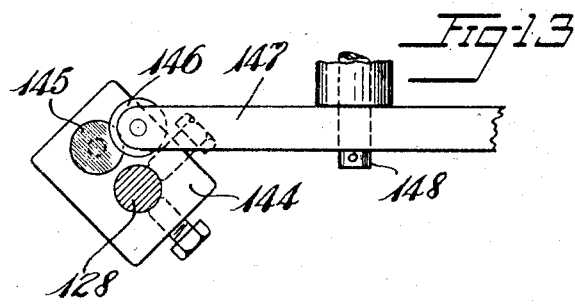

Patented Jan. 31, 1933

1,895,921

UNITED STATES PATENT OFFICE

HOWARD G. ELLIS, OF WALTHAM, MASSACHUSETTS, ASSIGNOR TO THE B. F. GOODRICH COMPANY, OF NEW YORK, N. Y., A CORPORATION OF NEW YORK

APPARATUS FOR ROLLING AND PRESSING RUBBER SHOES

Application filed April 7, 1931. Serial No. 528,258.

My invention relates to apparatus for rolling and pressing rubber shoes and especially to apparatus in which the lasts carrying the unvulcanized shoes are supported by a conveyor and the shoes are pressed and rolled while travelling with the conveyor.

One of the purposes of the invention is to provide automatic mechanism for performing the rolling and pressing operations. Other objects are to reduce cost of shoe manufacture, and to produce an improved product.

Other objects will appear from the following description and the accompanying drawings.

In the drawings, Fig. 1 is a side elevation of the pressing and rolling mechanism.

Fig. 2 is an end elevation from the left of Fig. 1 showing the conveyor mechanism in section.

Fig. 3 is a plan view of the pressing and rolling mechanism and a portion of the conveyor.

Fig. 4 is a sectional side elevation of the conveyor and its supporting frame showing the valve operating mechanism, and is taken on line 4—4 of Fig. 3.

Fig. 5 is a sectional elevation on line 5—5 of Fig. 1.

Fig. 6 is a sectional elevation on line 6—6 of Fig. 1.

Fig. 7 is a sectional elevation on line 7—7 of Fig. 1.

Fig. 8 is a detail sectional plan view taken on line 8—8 of Fig. 7.

Fig. 9 is a detail sectional elevation taken on line 9—9 of Fig. 8.

Fig. 10 is a detail elevation of the heel pressing mechanism taken on line 10—10 of Fig. 7, parts of the frame members being broken away and shown in section.

Fig. 11 is a detail elevation of the toe-cap rolling mechanism taken on line 11—11 of Fig. 7.

Fig. 12 is a detail sectional elevation on line 12—12 of Fig. 10, and

Fig. 13 is a detail sectional plan taken on line 13—13 of Fig. 11.

Referring to the drawings, and particularly to Figs. 1 and 2, the shoes, which have been assembled on the lasts L, are suspended on last jacks 1, which are mounted in spaced relation on a conveyor chain 2 and are guided in a determinate path by channel members 3, 4, with which rollers 5, 6, carried by the carriages 7, on which the last jacks are mounted, engage. Suitable frame members 8 support the channels 3, 4, at a fixed height. The pressing and rolling devices are mounted on a frame formed of vertical frame members 9, 10, to which are fastened horizontal frame members 11, 12, 13, and 14.

Frame members 9 and 10 are provided with vertically disposed bearing lugs 15, 16, in which are rotatably mounted vertical shafts 17. Shafts 17 are provided with fixed collars 18 and sprockets 19 which prevent end movement of the shafts in relation to the frame members. An endless chain 20 engages all four sprockets 19. A shaft 21, mounted in a bracket 22, on one of the frame members, is provided with a hand-crank 23 and a worm 21a designed to engage a worm wheel 24 mounted on one of the vertical shafts 17. The lower ends of shafts 17 are screw-threaded and engage threaded openings in pedestals 25 fixed to the floor. By means of the crank 23 and the mechanism just described, the frame which supports the pressing and rolling devices may be raised or lowered in relation to the lasts L so that the proper engagement of the various instrumentalities therewith may be maintained with different sizes and types of lasts. A bracket 26 mounted upon frame member 12 pivotally supports a bell-crank 27, the horizontal arm of which is pivoted to a rod 28 which is connected by a turnbuckle 29 to a rod 30 fastened to the floor, and the vertical arm of which is pointed and lies adjacent a scale 31 which may be graduated to indicate the proper position of the frame for lasts of different sizes.

The lasts carrying the shoes which have been assembled thereon are carried by the chain from left to right in Fig. 1, the last jacks being so adjusted, by the operators who assemble the shoe parts thereon, as to pass heel first through the pressing and rolling devices. In adjusting the last, in order that the proper alignment of the shoe will be attained, the operators leave the last inclined with the toe farther away from the conveyor and means is provided to properly align the shoe as follows:

Referring to Figs. 1 and 3, a pair of rollers 32, 33 are freely rotatable about vertical pins mounted upon a bracket 34 pivoted at 35 to frame member 9. A tension spring 36, engaging bracket 34 at one end and frame member 9 at the other, tends to rotate the bracket in an anti-clockwise direction in Fig. 3. A hand-screw 37 is threaded through a fixed lug on frame 19 and carries a hand wheel 38. The screw 37 impinges against bracket 34 and opposes the spring pressure. Hand wheel 38 may be turned to such a position that rollers 32 and 33 act as roller guides to properly align the lasts.

To provide means for automatically rolling the foxing, or that portion of the shoe where the sole is turned about the sole of the last and over the edges of the upper, I provide a series of pairs of spring-pressed rollers designated by the numerals 39, 40, 41, 42, and 43. These rollers are each supported by similar means and, referring to rollers 39, this means consists of a pair of swinging arms 44 pivoted as at 45 to brackets 46 carried by frame members 11 and 12. Each arm 44 is provided with a rod 47 pivoted thereto as at 48, and adapted to slide through an abutment member 49 mounted on a fixed frame member. A compression coil spring 50 is mounted on each rod 47 between the abutment 49 and a fixed collar 51, the arrangement being such that roller 39 is urged by the spring 50 towards the line of travel of the lasts. Rolls 39, 40, 41, 42, and 43 are so mounted as successively to engage with successive zones of the rubber material on the lasts and to this purpose are mounted at angles varying by 10 degrees from successive pair to pair, the first pair of rolls 39 being inclined at 10 degrees from vertical, the second pair of rolls 40 being disposed vertically, the pair of rolls 41 being inclined 10 degrees from the vertical in the opposite direction from rolls 39, etc.

It is evident that it would be impossible to engage all portions of the surface of the shoe by such means and I therefore provide additional means to roll and press the heel and toe portions and the parts of the upper not reached by the rolls 39, 40, 41, 42, and 43.

In order to compact the rubber material at the toe of the shoe I provide mechanism as follows:

Near the frame member 9, or at the entering end of the machine, a cross bar 52 extends from frame member 13 to frame member 14 and supports a bifurcated bracket 53 in which a trunnioned block 54 is free to rotate around an axis longitudinal of the machine. A pair of arms 55 and 56 have their lower extremities journaled on pivots, extending horizontally of the machine, on block 54 and at their upper extremities are pivoted to a link 57. Arms 55 and 56 are of equal length and the pivots on link 57 are equally spaced with the pivots on block 45. Link 57 supports a resilient pressing member 58. An extension spring 59 having one extremity anchored to frame member 9 as at 60 and the other extremity anchored to arm 55 at 61 normally holds arm 55 in the full-line position shown in Fig. 5 (see also Figs. 1 and 2) where the pressing member 58 is out of the path of the lasts.

Mounted on the conveyor frame, in close proximity to the chain 2, is a plate 62 (see Figs. 4 and 5) on which is mounted an air valve 63. A depressible cam bar 64 is pivoted to plate 62 and normally stands in the path of a valve operating pin 65 mounted on each carriage 7. As a carriage 7 passes the cam bar 64, the bar is depressed by the pin 65 and thereby opens the valve 63 admitting air under pressure from an air pressure main 66 through branch 67 and line 68 through flexible connection 68a to the lower end of a single-acting cylinder 69. Cylinder 69 is pivoted to frame member 9 by a universal joint 70 and is provided with a piston rod 71 which is pivoted to arm 55 at 72. When air is admitted to the lower end of cylinder 68 as described the piston rod 71 is forced upward causing arm 55 to swing to the dotted-line position of Fig. 5. Bar 64 is so located in relation to arm 55 that the movement of arm 55 just described will start after a last has just passed to such a position that its heel has contacted with rolls 39.

Block 54 carries an arm 73 provided with a stop pin 74. During the movement of arm 55 from the full line position to the dotted line position of Fig. 5, stop pin 74, on the lower part of arm 55, will depress and open a valve 75 stationarily mounted on plate 52 thereby admitting air under pressure from air pressure main 66 through pipe 76 and flexible pipe 77 to the lower end of a cylinder 78. Cylinder 78 is provided with a piston rod 79 pivoted at 80 to arm 55 and the cylinder is pivoted to frame member 9 by a universal joint 81. Admission of air to the lower end of cylinder 78 causes arm 55 and presser member 58 to travel to the right in Fig. 1 causing the presser member to impinge against the retreating toe of the last and to exert pressure to compact the rubber parts assembled thereon. The pressing of the toe will continue until pin 65 has passed shoe 64. At this point shoe 64 will be raised by a spring 82, valve 63 will be closed against pressure line 67 and cylinder 69 will be opened to the atmosphere through valve 63, spring 59 will return arm 55 to the full-line position in Fig. 5 out of the line of travel of the lasts thereby lifting stop 74 from valve 75, valve 75 will close against pressure line 76 and open cylinder 78 to the atmosphere. Spring 59 causes arm 55 to return piston rod 79 to its original position.

As the operation of the toe pressing device just described requires that arm 55 shall clear all lasts on the conveyor I have provided means for preventing motion of the conveyor when arm 55 fails to be returned to its inactive position, as upon failure of any of the mechanism. This means is as follows:

Mounted on the conveyor frame 8 to the right of plate 62 in Fig. 4 is a plate 83 on which is mounted a push-button control switch 84 located electrically in a motor control circuit of the conveyor driving motor, not shown. Switch 84 is provided with an operating button 85, which if pressed to the left in Fig. 4, will stop the motor and therefore the conveyor. Located on plate 83 is a block 86 and a horizontal stud 87. A lever 88 of the first class is pivoted on the stud 87 and is normally held in a vertical position by a tension spring 88a and a fixed stop 89. In this position the upper end of lever 88 will stand in the path of pin 65. Pivoted to the lower end of lever 88 is a plunger 90 which rests upon the block 86 and in alignment with the button 85 when arm 55 is in the path of the lasts. Piston rod 71 of cylinder 69 carries an arm 91 clamped thereto. Cylinder 69 carries a lug 92 in which a slide rod 93 is guided. Rod 93 is provided with stop collars 94 and 94a near its upper end between which arm 91 is slidable on rod 93 and its lower extremity is fastened to a flexible wire 95 adapted to slide through a flexible conduit 96 one end of which is fastened to cylinder 69 and the other end of which is fastened to block 86. When piston rod 71 is projected from cylinder 69, arm 91 contacts with stop 94 drawing wire 95 through conduit 96 to such an extent that plunger 90 rests on block 86. In this position arm 55 will be in the path of the lasts and should the pin 65 of an oncoming last contact with lever 88, plunger 90 will be projected against push-button 85 stopping the conveyor. When piston rod 71 is retracted, arm 91 will depress stop collar 94a on rod 93 and wire 95 will be so moved as to cause its free end to project above block 86. An oncoming last pin 65 will deflect lever 88 as before but plunger 90 will be in the dotted line position of Fig. 4 and will be projected to the left above push-button 85 and the conveyor will continue its movement.

In order to roll certain portions of the toe cap and vamp of the shoe not reached by rollers 39, 40, and 41, I provide a pair of rollers 97, best shown in Fig. 6. These rollers are mounted to freely rotate on the upper extremities of bell crank 98, pivoted at 99 on a cross-frame member 100. The horizontal arms of bell cranks 98 are pivotally connected to plunger rods 101 supported through compression springs 102 by a cross head 103 carried by a cylinder 104. Cylinder 104 is provided with a piston 105, fixed to a cross-frame member 106. Springs 107 anchored to frame-member 100 hold rolls 97 normally in the full-line position, but air admitted to cylinder 104 through a flexible tube 108a from pipe 108 will cause cylinder 104 to rise to the full line position and cause rollers 97 to be pressed against the last.

A valve 111 mounted on plate 83 (see Figs. 4 and 6) is adapted to be operated by pin 65 contacting with and depressing a cam bar 109 thereby admitting air under pressure from pressure main 66 through branch line 110 to pipe 108. Cam bar 109 is so located in relation to a passing last as to force rollers 97 toward each other as soon as the shank of the last has passed these rolls whereupon the rolls contact with the shoe rolling down the sides near the toe cap. The pin 65 then releases the bar 109 cutting off the air supply to cylinder 104 and opening the exhaust, whereupon springs 107 return rolls 97 to the full-line position.

In order to roll the top of the toe not reached by rollers 97 I provide a toe-cap rolling device as follows: Referring particularly to Figs. 1, 7, and 11, mounted upon frame member 12, and fastened thereto, is a frame member 120 provided with a machined guideway in which a carriage 121 is adapted to slide vertically. Carriage 121 is formed with a projecting boss 122 in which is journaled a vertical pin 123. A bifurcated arm 124 straddles the boss and engages the pin 123. Arm 124 carries a horizontally disposed freely rotatable roller 125. Arm 124 is free to swing horizontally through 90 degrees in an anti-clockwise direction from the position shown in Fig. 3 to clear the shank of lasts passing on the conveyor and to be returned to the position shown as soon as the shank of a last has passed. To effect swinging thereof the lower bifurcation of arm 124 is provided with gear teeth 126 which engage a long pinion 127 fixed to a vertical shaft 128 journaled at the top of frame member 120 to a bracket 129 and near its lower end in a plate 130 fixed to frame member 14. The lower end of shaft 128 carries a crank 131 to which is pivoted the piston rod 132 of a cylinder 133. Cylinder 133 is pivoted at 134 to frame member 13. When air under pressure is admitted to cylinder 133, shaft 128 will be rotated in a counter-clockwise direction (see Fig. 3) and roller 125 will be moved to a position over the toe of the last. A tension spring 135 having one end attached to the piston rod 132 and the other to the frame member 14 normally holds the roller 125 in the inactive position. By means of another air cylinder 136 anchored at 137 to frame member 120 and having its piston rod 138 fastened to slide 121, and having means for admitting air under pressure to its upper end, roller 125 may be forced downward in contact with the toe of the last and during such movement the upper bifurcation of the arm 124 will be confined against rotative movement in a slot provided therefor in frame member 120. A tension spring 139, having its upper end anchored on the frame member 10 and its lower end anchored to a stop 140 on a vertical rod 141, which has its upper end impinging against arm 124 in a socket 124a, provided therefor and its lower end sliding through plate 130, is adapted to return carriage 120 and roller 125 to their upper positions when the air pressure is released from cylinder 136.

A valve 112 mounted on a plate 113 on the frame of the conveyor is adapted to be actuated by pin 65 contacting with and depressing a bar 114 thereby admitting air under pressure from pressure main 66 and branch line 115 through a pipe 116, a valve 142, and a pipe 143 to the right end of cylinder 133 as seen in Fig. 7, thereby causing piston rod 132 to be moved to the left or toward the cylinder, and causing roller 125 to be moved to a position above the toe of the last on the conveyor. The turning movement rotates shaft 128 on which is mounted a collar 144 having an inclined cam surface, 145. Cam surface 145 engages a corresponding surface 146 on a lever 147 pivoted to the frame member 120 at 148, thereby depressing the opposite end of the lever which engages a rod 150 between stop collars 149 and 149a depressing the same. Rod 150 is guided at its lower end by a block 151 pinned thereto and slidably mounted in a slot 130a in plate 130. A tension spring 152 normally holds the block 151 to the right end of the slot (see Fig. 9). Rod 150 carries a stop collar 153 fastened thereto and a loose collar 154 having a latch shoulder 155 with a compression spring 156 encircling the rod therebetween. A shoulder 157 on block 151 extends upwardly beyond latch collar 154 and slidably engaging a flat surface thereon prevents collar 154 from rotating on the rod. A valve 158 is mounted on plate 130 in such a position that when rod 150 descends, latch 155 engages valve-actuating trigger 159 opening the valve to admit air under pressure from main 66 and branch 160 through pipe 161 to the upper end of cylinder 136. This causes roller 125 to descend against the toe of the last. As the last advances, the roller 125 rolls off the end of the toe thereof and descends to such a position that stop 140 contacts with a lever 162 mounted on a horizontal shaft 163 (see Fig. 8) journaled on plate 130, as at 164. The opposite end of shaft 163 has fixed thereto a crank 165 carrying a crank-pin 166 which engages in a vertical slot 167 in block 151. Through this mechanism the contact of stop 140 causes block 151 to be moved to the dotted line position shown in Fig. 9 releasing trigger 159, closing the pressure line to cylinder 136 and opening the exhaust. Spring 139 then raises roll 125 to its highest position. As pin 65 releases bar 109 spring 135 automatically moves the roller 125 out of the path of the next last.

To insure stopping of the conveyor should roll 125 remain in the path of the oncoming last I provide a crank 170 on shaft 128 adapted to impart end movement to a rod 171 slidably mounted in bearings 172 and having fixed at one end a flexible wire 173 adapted to slide through a flexible conduit 174 one end of which is clamped to the plate 130 at 174a and the other end of which is clamped in block 86 (see Fig. 4). Wire 173 extends through block 86 and engages plunger 90 in the same manner as wire 95 previously described. By this mechanism the conveyor is automatically stopped if the roller 125 accidentally remains in the path of the oncoming last.

To compact the material at the heel of the shoe I provide a frame member 175 rigidly mounted on frame member 10 and machined to provide a guideway 176 in which a carriage 177 is adapted to travel on rollers 178 parallel to the line of travel of the lasts. Located at one side of the path of last travel on the carriage 177 is a vertical pin 179 on which a gate 180 carrying a rubber heel pressing cushion 181 is mounted to swing through an angle of approximately 90 degrees. In the dotted-line position of Fig. 3 the gate is nearly at its open position and the last is free to pass. In the full-line position the gate is across the path of the last and is held in such position by a latch 182 pivoted at 184 to the gate and engaging a pin 183 on the carriage 177. A spring 185 holds the latch in locked position. The oncoming shoe engaging the gate pushes the carriage 177 along the guideway to the dotted-line position of Fig. 3. At this point an inclined cam-surface 186 engages the latch 182 and disengages it from pin 183 whereupon the shoe pushes the gate to its open position.

A cable 187 (see Fig. 10) has one end fixed to the carriage 177 and the other to the frame at 188. It passes over a grooved pulley 189 and a bight thereof is engaged by a grooved pulley 190 mounted in a shackle 191 on the piston rod 192 of a cylinder 193. When air under pressure is admitted to the upper end of cylinder 193 piston rod 192 is withdrawn pulling carriage 177 to the left in Fig. 10. A rod 194 is free to slide through a collar 195 which is pivoted on a pin 196 mounted eccentrically to pin 179 on gate 180. Stop collars 197 and 198 are fastened to said rod and a compression coil spring 199 encircles the rod between collars 195 and 198. The free end of the rod is slidably mounted in a loose opening in a bracket 201. During the movement of the carriage last described stop 198 contacts with bracket 201 and compressing spring 199 closes the gate 180.

A valve 202 located on plate 113 is adapted to be operated by a bar 203 when the bar is depressed by pin 65 and then supplies air under pressure from main 66 and branch line 204 through pipe 205 to the upper end of cylinder 193. I find it desirable to have the heel pressing device 181 start its operation before starting the toe-cap rolling device 125, as the heel pressing device then acts to support the last against deflection. For this purpose valve-operating shoe 203 is placed slightly in advance of valve-operating shoe 114 and valve 142 is inserted in the line between pipes 141 and 143. Valve 142 is placed on frame member 175 with its operating plunger 206 facing toward carriage 177 (see Fig. 10). This valve is so designed that it is normally open. When the carriage 177 is at the extreme left of Fig. 3 it impinges against the plunger 206 and closes the valve, preventing operation of the toe-cap rolling device. When the heel of a last engages the heel pressing cushion 181, the carriage 177 is moved in a direction away from valve plunger 206 and against the pressure exerted by cylinder 193. As soon as the plunger 206 is cleared the toe-cap rolling device will start its operation. By means of this arrangement unnecessary waste of compressed air is prevented when last jacks not supplied with lasts are passing as when starting the day's work as no continued operation of cylinders 193, 136, and 133 can take place unless a last moves carriage 177 away from plunger 206.

A guard roller 207 (see Fig. 1) is mounted on pin 179 to engage the ball of the toe and prevent it from dragging across the heel-pressing cushion. This roller as well as all of the shoe-contacting rollers described are preferably formed of soft vulcanized rubber and the toe and heel pressing cushions are made of the same material.

The operation of the device is as follows: The shoe parts having been assembled on lasts on the conveyor the lasts enter the machine from the left of Fig. 3 heel first. Rollers 32 and 33 align the lasts with the rolling devices. As the last engages rollers 39, 40, and 41 these rolls yieldingly conform to the surface thereof and roll the foxing along the sides of the shoe. As the last contacts with the first pair of rollers 39 the toe pressing pad 58 moves into the line of last travel follows the last, pressing the toe of the same and then returns to its original position. Rolling of the foxing is continued by the rollers 42 and 43 and rollers 97 engage the sides of the upper portion of the vamp against which they are automatically moved as soon as the shank of the last has passed. The heel of the last next reaches the heel pressing pad 181 which it moves before it against the resistance of the air cylinder 193. As the pressing pad 181 starts its motion, toe-cap roller 125 is swung into the line of last travel and descends pressing upon the toe of the last and rolling down over the toe cap. The toe cap roll then returns to its upper position and is swung out of the line of last travel. As the gate 180 reaches its extreme outward position it is unlatched and allows the last to pass on its way.

What I claim is:

1. Apparatus for rolling and pressing shoe parts assembled on lasts, said apparatus comprising means for supporting and conveying the lasts in a determinate path, yieldably mounted rollers for compacting the shoe parts along the sides of the last, and non-rotatable pressing means automatically movable into the path of the lasts for pressing a portion of the shoe parts inaccessible to the rollers without rolling the same.

2. Apparatus as defined by claim 1 including means controlled by the movement of the pressing means for automatically stopping the conveyor means on failure of said pressing means to move out of the path of an oncoming last.

3. Apparatus for rolling and pressing shoe parts assembled on lasts, said apparatus comprising means for supporting and conveying the lasts in a determinate path, yieldably mounted rollers for compacting the shoe parts along the sides of the last, and a toe pressing device automatically movable into and out of the line of travel of the lasts for engaging the upper surface of the toe portions of successive lasts and compacting the material thereon.

4. Apparatus for rolling and pressing shoe parts assembled on lasts, said apparatus comprising means for supporting and conveying the lasts in a determinate path, yieldably mounted rollers for compacting the shoe parts along the sides of the last and a heel pressing device adapted to obstruct the lasts in their travel, to be yieldingly propelled thereby, and to automatically move out of the path of the lasts at a determinate point in their travel.

5. Apparatus for rolling and pressing shoe parts assembled on lasts, said apparatus comprising means for supporting and conveying the lasts in a determinate path, yieldably mounted rollers for compacting the shoe parts along the sides of the last and a roller automatically movable into the line of travel of the lasts, means for pressing said roller against the upper surface of the toe portion, and means for automatically moving the roller out of the path of travel of the lasts to clear the shank portions thereof.

6. Apparatus for rolling and pressing shoe parts assembled on lasts, said apparatus comprising means for supporting and conveying the lasts in a determinate path, yieldably mounted rollers for compacting the shoe parts along the sides of the last, and non-rotatable pressing means for automatically pressing the material about the heel of the last.

7. Apparatus for rolling and pressing shoe parts assembled on lasts, said apparatus comprising means for supporting and conveying the lasts in a determinate path, yieldably mounted rollers for compacting the shoe parts along the sides of the last, and means for automatically rolling the material along the top of the toe of the last.

8. Apparatus for rolling and pressing shoe parts assembled on lasts, said apparatus comprising conveyor means for moving a series of lasts in procession, stationary means mounted along said conveyor for rolling certain portions of shoe parts on said lasts, and non-rotatable pressing means automatically controlled by the movement of the conveyor for compacting other portions thereof during said movement without rolling the same.

9. Apparatus for rolling and pressing shoe parts assembled on lasts, said apparatus comprising conveyor means for moving a series of lasts in procession, and means automatically actuated by the movement of the lasts for successively entering the spaces between the lasts and performing a compacting operation on portions of the shoe parts on the lasts.

10. Apparatus for rolling and pressing shoe parts assembled on lasts, said apparatus comprising conveyor means for moving a series of lasts in procession, and non-rotatable pressing means automatically actuated by the movement of the lasts for successively engaging the shoe parts thereon and performing compacting operations thereon without rolling the same.

11. Apparatus for rolling and pressing shoe parts assembled on lasts, said apparatus comprising conveyor means for moving a series of lasts in procession, a series of rolling and pressing devices located in succession along the path of travel of said lasts, a series of actuating devices for controlling the successive operation of the rolling and pressing devices, and means carried by the conveyor for intermittently operating said devices.

12. Apparatus for rolling and pressing shoe parts assembled on lasts, said apparatus comprising conveyor means for moving a series of lasts in procession, a toe-cap roller normally located out of the path of travel of the lasts, means for moving said roller into the path of travel with its axis across said path and above the toe portion of a last, means for pressing said roller against the upper over the toe during the travel of the last, and means for moving the roller out of the path of travel of the lasts to clear the shank of the oncoming last.

13. Apparatus as defined by claim 12, including means for supporting the heel of the last against deflection during the rolling of the toe.

14. Apparatus for rolling and pressing shoe parts assembled on lasts, said apparatus comprising conveyor means for moving a series of lasts in procession, a heel-pressing device movable into and out of the path of travel of said lasts, means for moving the heel pressing device into said path, means for locking said device across said path, means for resisting movement of the device along said path to compact the material on said last, and means for automatically releasing said locking device to permit continued motion of the last.

15. Apparatus for rolling and pressing shoe parts assembled on lasts, said apparatus comprising conveyor means for moving a series of lasts in procession, a pair of rolling devices between which the lasts are adapted to pass during their movement, means actuated by the movement of a last for pressing the rollers in contact therewith, and means for automatically returning the rollers to their inoperative position to allow the shank of the succeeding last to pass.

In witness whereof I have hereunto set my hand this 31st day of March, 1931.

HOWARD G. ELLIS.